United States Patent [19]

Virtue

[11] Patent Number: 4,841,877
[45] Date of Patent: * Jun. 27, 1989

[54] TABLE

[75] Inventor: Julian A. Virtue, Los Angeles, Calif.

[73] Assignee: Virco Mfg. Corporation, Los Angeles, Calif.

[*] Notice: The portion of the term of this patent subsequent to Mar. 1, 2005 has been disclaimed.

[21] Appl. No.: 160,136

[22] Filed: Feb. 25, 1988

Related U.S. Application Data

[63] Continuation-in-part of Ser. No. 918,486, Oct. 14, 1986, Pat. No. 4,727,816.

[51] Int. Cl.$^4$ ............................ A47B 3/00; A47B 7/00
[52] U.S. Cl. ........................................ 108/36; 108/91; 108/112
[58] Field of Search ...................... 108/36, 35, 112, 91

[56] References Cited

U.S. PATENT DOCUMENTS

| | | | |
|---|---|---|---|
| 2,480,460 | 8/1949 | Freund | 108/112 X |
| 2,643,926 | 6/1953 | Pucci | 108/36 X |
| 2,747,957 | 5/1956 | Lencioni | 108/36 |
| 2,903,313 | 9/1959 | Block | 108/35 |
| 3,304,891 | 2/1967 | Rachman | 108/36 |
| 3,368,504 | 2/1968 | Cohen | 108/36 |
| 4,727,816 | 3/1988 | Virtue | 108/91 |

Primary Examiner—Francis K. Zugel
Attorney, Agent, or Firm—James E. Brunton

[57] ABSTRACT

A folding table construction embodying a planar top, foldable legs and a novel apron assembly connected to the underside of the top. The apron unit comprises elongated discrete, relatively short straight lengths of formed metal side and end strips, or stringers, which are securely interconnected together by spaced apart, one-piece, blow molded corner moldings adapted to be affixed to the underside of the table top. Due to the novel design of the corner moldings and the stringers, the construction of the supporting apron requires no metal bending or welding. Further, the corner moldings can be colored during the molding step and the stringers can be painted to match in small painting units prior to apron assembly. In an alternate form of the invention, the planar top is constructed in two pieces and the side stringers are constructed in two pieces which are hingably interconnected so that the table top can be folded for ease of transport and storage.

5 Claims, 6 Drawing Sheets

U.S. Patent  Jun. 27, 1989  Sheet 1 of 6  4,841,877
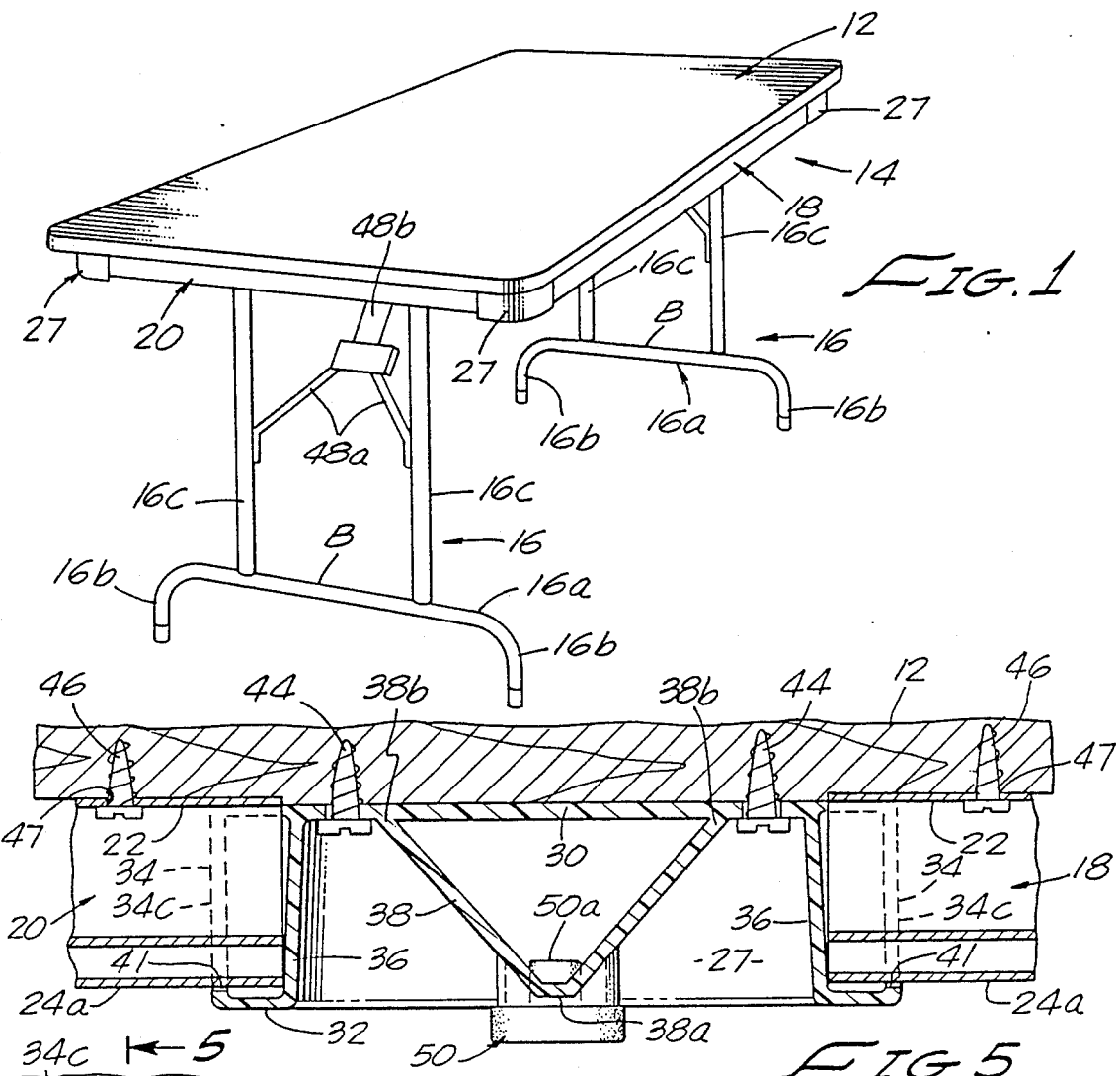
FIG. 1
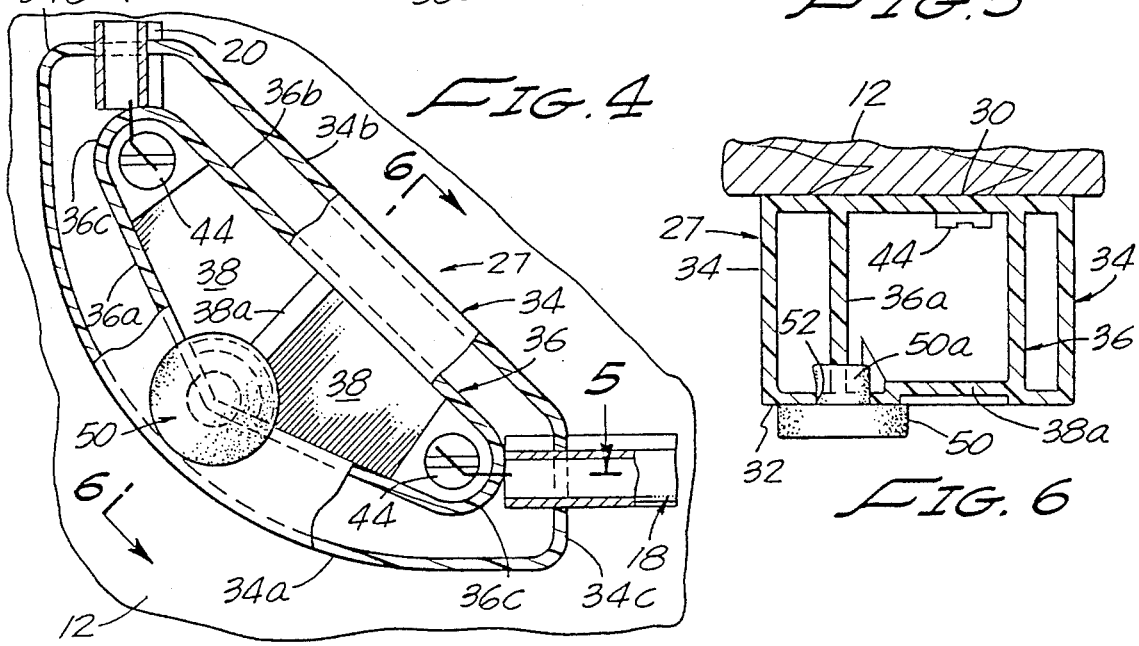
FIG. 4
FIG. 5
FIG. 6

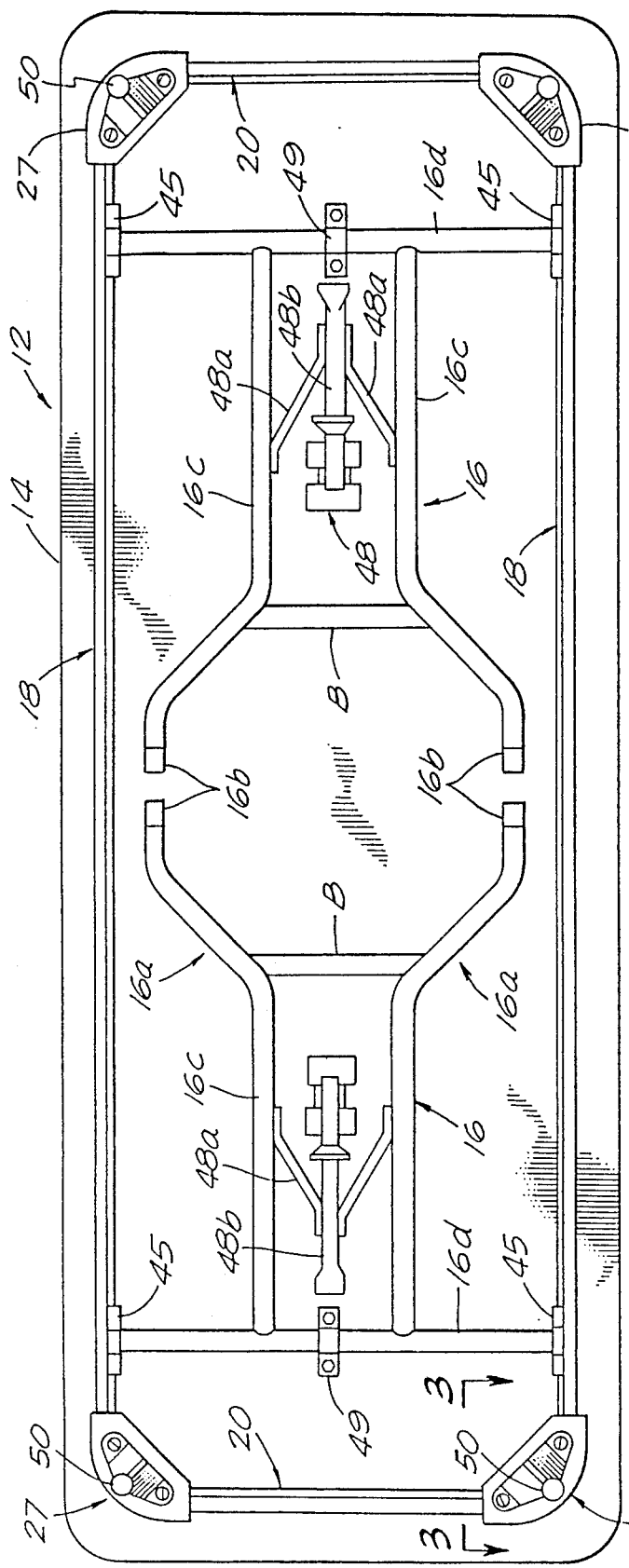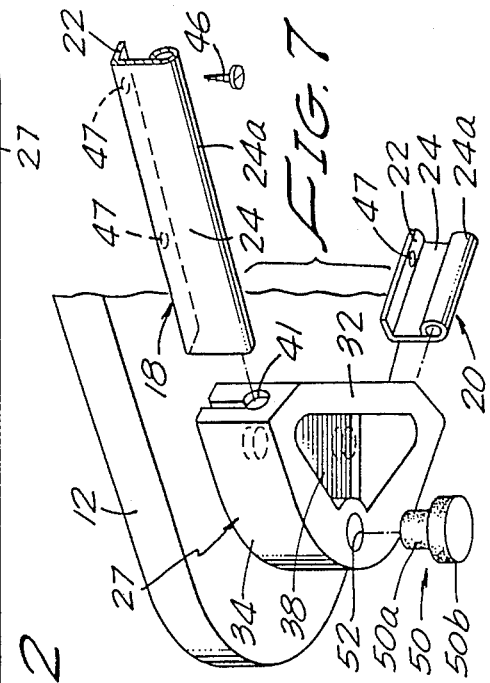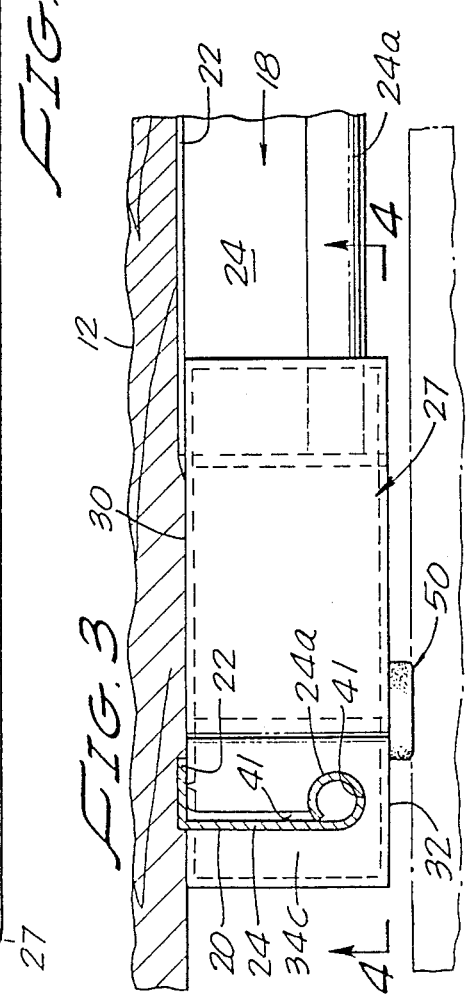

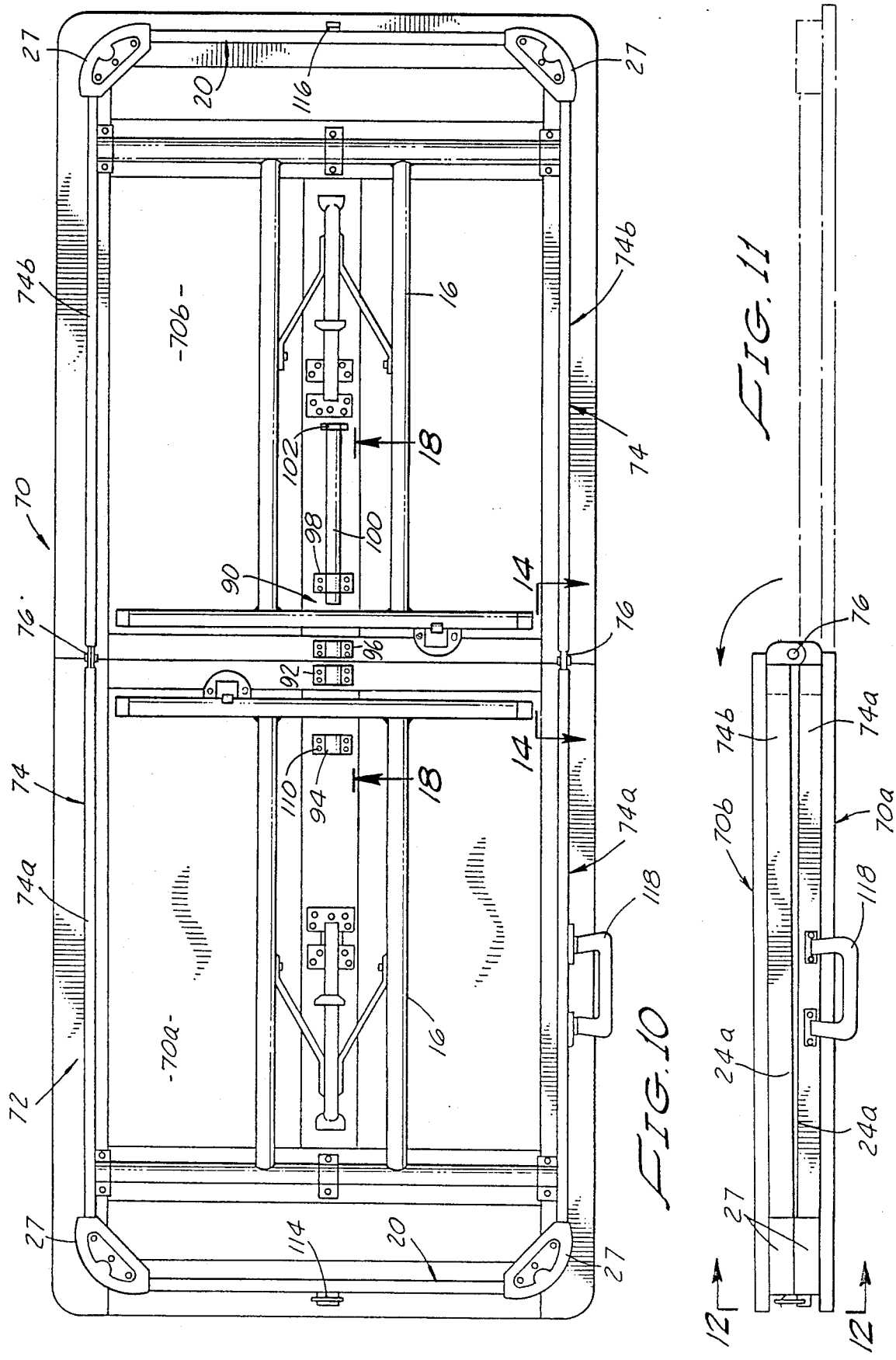

TABLE

This is a continuation-in-part application of co-pending application U.S. Ser. No. 918,486, filed Oct. 14, 1986 now U.S. Pat. No. 4,727,816.

BACKGROUND OF THE INVENTION

1. Field of the Invention

The present invention relates generally to table construction. More particularly the invention concerns a folding table construction embodying a planar top, foldable legs and a novel apron assembly connected to the underside of the top comprising spaced apart molded corner moldings which are uniquely slotted to closely receive and securely support the end portions of specially configured elongated side and end structural members of the apron.

2. Discussion of the Prior Art

Folding tables of numerous designs and for various uses exist in the prior art. Common features of most such tables include a generally rectangularly shaped planar top, a generally rectangularly shaped supporting apron upon which the top rests and spaced apart downwardly extending legs which support the top in an elevated generally horizontal position.

As a general rule, the supporting aprons of prior art tables are constructed from a single, long length of relatively heavy gauge L-shaped sheet metal which is bent to form a generally rectangular shaped, planar configuration. After bending the L-shaped metal strip, the adjacent free ends thereof are joined, as by welding, and the apron thus formed is painted and then connected to the bottom surface of the table top. This bending, welding and painting operation is inordinately time consuming and expensive. Further, because the apron must be painted after the welding step, relatively large and expensive paint spray booths are required for the painting operation. Additionally, aprons made by this conventional process tend to warp out of plane during welding and handling and are extremely cumbersome to handle, ship and store.

The table construction of the present invention overcomes the drawbacks of the prior art as set forth in the preceding paragraphs by utilizing a novel apron assembly, the construction of which requires no bending of metal and no welding. Further, painting of the apron of the invention is greatly simplified because the elongated stringer members which make up the apron assembly comprise discrete, relatively short straight lengths of formed metal strips which can expeditiously be painted in small painting enclosures prior to the final assembly of the apron. Additionally, because the metal stringers which make up the apron assembly are straight and light weight, they are very easy to handle, transport and store.

Further simplifying the table construction of the present invention is the fact that the metal stringers which form the sides and ends of the apron are uniquely interconnected together by means of novel one-piece, pre-colored, molded corner pieces which are specially slotted to closely receive and securely support the end portions of the stringers which form the apron sides and ends. The corner moldings are attractive, extremely strong and durable. They require no painting and can be very inexpensively made in large quantities.

The unique apron unit of the present invention can be readily assembled by unskilled workers to repeatedly and reliably form a perfectly square, planar structure. The apron, which is connected to the underside of the table top by suitable connectors, also uniquely functions to hingably carry and support the leg assemblies of the table for movement between a first downwardly extending position to a second folded position wherein the leg assemblies are disposed in close proximity with the underside of the table top.

Summary of the Invention

It is an object of the present invention to provide a novel folding table construction which embodies a top supporting apron assembly which is inexpensive to manufacture and is easy to handle, ship and store. More particularly it is an object of the invention to provide a uniquely configured supporting apron unit which comprises elongated discrete, relatively short straight lengths of formed metal side and end strips, or stringers, which are securely interconnected together by spaced apart, one-piece, molded corner pieces adapted to be affixed to the underside of the table top.

Another object of the invention is to provide a table construction of the aforementioned character in which the construction of the supporting apron requires no metal bending or welding.

Still another object of the present invention is to provide a table construction as described in the preceding paragraphs in which the corner moldings which interconnect and support the side and end stringers are one colored and require no painting.

Another object of the invention is to provide a novel table construction in which the side and end stringers of the supporting apron unit can be conveniently painted as discrete elements prior to the final assembly of the apron assembly.

Another object of the invention is to provide a unique top supporting apron assembly which embodies corner moldings which are attractive, which are interiorly reinforced so as to be extremely strong and durable in use and which can be very inexpensively manufactured in quantity.

Yet another object of the invention is to provide a novel supporting apron assembly of the character described in the preceding paragraph in which the metal stringers forming the sides and ends of the apron terminate in a uniquely configured lower edge which is rounded so as to prevent injury to persons lifting the tables by gripping the underside of the apron. To accommodate the rounded lower edge portions of the stringers, the corner moldings are provided with novel key shaped slots which closely receive and support the end portions of the stringers.

Still another object of the invention is to provide a table construction of the class described in which each assembled apron unit is perfectly planar and is provided with uniquely configured bumper members carried by each corner molding to permit one table to be stacked upon another without causing damage to either table.

Yet another object of the invention is to provide a table construction embodying an apron assembly of the character described in the preceding paragraphs which is of sufficient strength to hingably support the foldable leg members of the table to permit smooth pivotal movement thereof between an extended position and a storage position.

Another object of the invention is to provide a table construction embodying an apron assembly which comprises first and second hingably interconnected side rails supporting first and second top portions. With this construction, the table can be folded into a very compact structure for easy transportation and storage.

These and other objects of the invention are realized by a novel table construction which includes a generally planar top, an apron assembly connected to the underside of the top and folding legs pivotally connected to the apron assembly. The apron unit of the invention comprises at least three elongated generally L-shaped members, or stringers, and at least three spaced apart, molded corner members each having a top wall, a spaced apart bottom wall, external side walls interconnecting the top and bottom walls. The external walls of each corner member is provided with at least two vertically extending slots adapted to closely receive and support the end portions of the elongated stringers.

BRIEF DESCRIPTION OF THE DRAWINGS

FIG. 1 is a generally perspective view of one form of the folding table invention.

FIG. 2 is an enlarged bottom view of the table in a folded configuration.

FIG. 3 is an enlarged fragmentary view taken along lines 3—3 of FIG. 2.

FIG. 4 is a fragmentary cross-sectional view taken along lines 4—4 of FIG. 3.

FIG. 5 is a fragmentary cross-sectional view taken along lines 5—5 of FIG. 4.

FIG. 6 a fragmentary cross-sectional view taken along lines 6—6 of FIG. 4.

FIG. 7 is a fragmentary, generally perspective view illustrating the general configuration of the corner elements of one form of the present invention and the manner of assembly of the side and end stringers therewith.

FIG. 10 is a bottom view of an alternate form of the invention showing hingably movable first and second parts of the folding table top.

FIG. 11 is a side elevational view showing, in the solid lines, the table in a folded configuration and showing the table in the phantom or dotted lines in an unfolded planar configuration.

DESCRIPTION OF ONE FORM OF THE INVENTION

Figure 8:
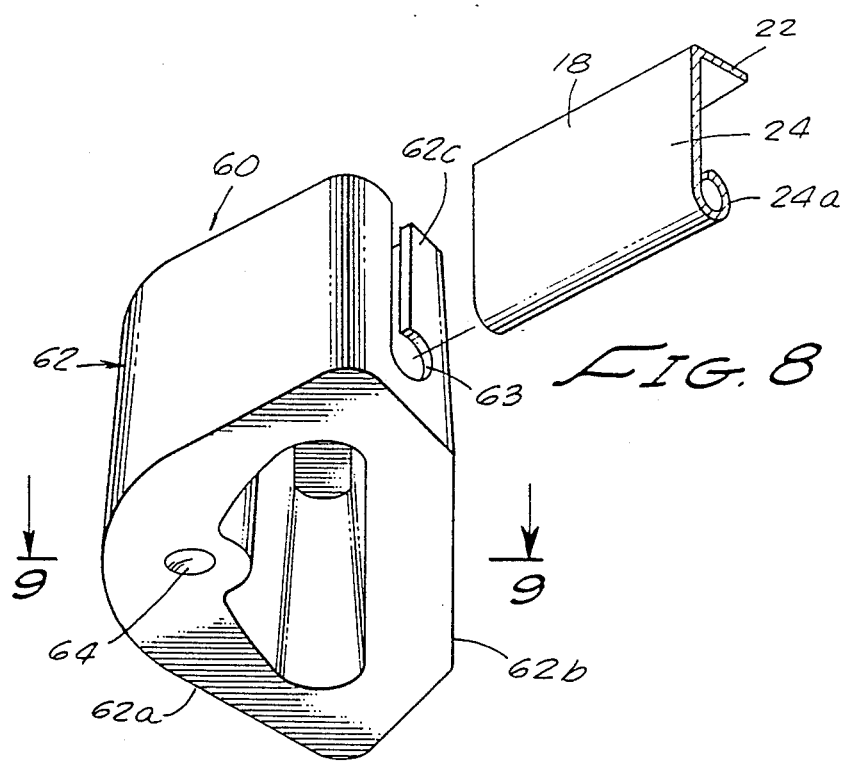
FIG. 8 is a generally perspective exploded view of an alternate form of corner molding.

Referring to the drawings and particularly to FIGS. 1 and 2, the table construction of one form of the present invention comprises a generally planar top 12, an apron assembly 14 connected to the underside of the top and two pairs of longitudinally spaced leg assemblies 16 which are hingably interconnected with apron assembly 14.

Turning also to FIGS. 4 and 5, the apron assembly 14 of this form of the invention comprises four elongated stringers, or angle members, which are substantially L-shaped in cross-section. Two of the four stringers are side stringers 18 and two of the stringers are end stringers 20 (FIG. 2). As best seen by turning to FIG. 7, each of the stringers has a base portion 22 and a generally perpendicularly downwardly extending wall portion 24 connected to the base portion. The wall portions 24 of each stringer terminate in a curved lower edge portion 24a, which, as indicated in FIG. 3, is generally circular in cross-section at any point.

Also forming an important part of the apron assembly of the invention are four one-piece, injection molded corner members, or moldings, 27 (FIG. 2). These corner moldings 27 are affixed by suitable connectors to the underside of the table top 12 at spaced apart locations proximate the corners of the table top. The corner moldings 27, which are of a unique configuration presently to be described, function to rigidly support the end portions of the stringers 18 and 20.

Turning now to FIGS. 4 through 7, the corner members 27 each have a top wall 30, a vertically spaced bottom wall 32 and external side walls 34 interconnected with one another and functioning to interconnect the top and bottom walls. As best seen in FIG. 4, the external walls include a curved outer portion 34a, a generally straight inner portion 34b and transversely spaced angularly extending portions 34c which serve to interconnect portions 34a and 34b. Disposed in an internally spaced relationship with respect to external side walls 34 are reinforcing means here comprising internal walls 36. Internal walls 36 comprise a portion 36a internally spaced from external wall 34a, a generally straight section 36b spaced internally from external wall 34b and arcuate end portions 36c interconnecting wall portions 36a and 36b. For a purpose presently to be described, end portions 36c are spaced inwardly from wall portions 34c of the external walls by a predetermined limited distance.

To further structurally reinforce the corner mold members 27, a pair of angularly downwardly extending walls 38 are provided internally of the space defined by internal walls 36. Walls 38, which also comprise the reinforcing means of this form of the invention, are integrally formed at their edges with internal walls 36 and join together at an apex, or ridge, 38a. The upper extremities 38b of walls 38 interconnect with top wall 30 in the manner shown in FIG. 5.

Each of the corner mold members 27 has the structurally reinforced configuration described in the preceding paragraph and each is formed in a single piece by an injection molding process of a character well understood by those skilled in the molding art. While other materials may be used, polyethylene and polypropylene have proven to be satisfactory as construction materials for forming the corner members 27. This material can be colored to produce an end part of almost any desired color which will correspond closely to the color of the paint used to paint the stringers 18 and 20.

Referring once again to FIGS. 3 and 7, portions 34c of the external walls 34 of each corner member 27 is provided with a generally keyhole shaped slot 41 which is adapted to closely receive the end portions of the stringers 18 and 20 which make up the apron assembly 14.

As best seen in FIG. 4, when the stringers 18 and 20 are assembled with the corner mold members 27, the end portions of these stringers are inserted within apertures 41 until the extremities of the stringers move into engagement with end wall portions 36c of internal walls 36. This precise positioning of the stringers within the corner members 27 insures that a rigid structural assembly will result, which assembly is of precisely predetermined dimensions, is substantially perfectly rectangular in shape and is substantially flat, or planar.

As indicated in FIG. 5, each of the corner members 27 is rigidly affixed to the underside of the table top 12 by means of threaded fasteners 44. Similarly, after the stringers 18 and 20 have been inserted into the corner members in the manner shown in FIG. 4, the stringer members 18 and 20 are affixed to the underside of the table top by means of threaded fasteners 46 which extend through longitudinally spaced apart drilled holes 47 provided in base walls 22 of the stringers members.

Turning once again to FIGS. 1 and 2, the spaced apart leg assemblies 16 of this form of the invention comprise a generally U-shaped portion 16a having downwardly depending, floor engaging legs 16b. Interconnected with the bight portion "B" of the U-shaped member 16a are transversely spaced, upwardly extending columns, or legs, 16c. As best seen in FIG. 2, the ends of legs 16c opposite to those connected to the bight portions "B" are interconnected to transversely extending axle members 16d which, in turn, are hingably carried by stringer members 18. With this construction, leg assemblies 16 are movable between a first downwardly extending position, as illustrated in FIG. 1, to a second folded position, as illustrated in FIG. 2, wherein the leg assemblies are in close proximity with the lower surface of the top 12 and extend generally parallel to the plane thereof. To facilitate smooth rotational movement of the axle member 16d, bearing means or assemblies 45 are carried by stringer members 18 at longitudinally spaced apart locations. To provide further support to the axle members 16, centrally disposed bearing means or assemblies 49 are affixed to the underside of the tabletop 12.

A locking assembly, generally designated by the numeral 48, is provided in operable association with each pair of leg assemblies 16 to releasably lock the leg assemblies in the downwardly extending position shown in FIG. 1. These locking assemblies 48 are of a type well known to those skilled in the art and form no part of the present invention. The assemblies comprise a pair of side members 48a which are interconnected at one end with legs 16c and are interconnected at the other end with a central slide mechanism 48b which is suitable mounted to the underside of the tabletop 12.

Interconnection of axle members 16d with the stringers 18 via the bearing assemblies 45 results in a highly rigid and stable structural configuration superior to prior art table constructions wherein the legs pivot about hinge mechanisms affixed only to the underside of the top of the table.

When the leg assemblies are in the folded configuration shown in FIG. 2, it is quite common to store several of the folded tables in one location by stacking one table on top of another. When this was done with prior art configurations, the top of one table was very often scarred, scratched, or otherwise damaged by the apron of the second table sliding on the tabletop. To remedy this prior art deficiency, the apron assembly of the present invention includes uniquely configured bumper means carried by the corner members 27 for engagement with the planar surface of the table upon which the apron rests. These bumper means are designed to prevent scarring of the adjacent tabletop and to prevent the table construction from accidentally sliding with respect to the tabletop of the adjacent table. In the present form of the invention, these bumper means are provided in the form of one-piece members formed of a resilient material such as rubber, teflon, soft plastic or the like. Each of the bumper members, which are generally designated in the drawings by the numeral 50, have a first generally cylindrical portion 50a and a second enlarged diameter cylindrical portion 50b (FIG. 7). With this construction, each of the corner mold member 27 is provided with a central aperture 52 adapted to closely receive the first cylindrical portion 50a of the bumper 50. As indicated in FIG. 6, when the bumper 50 is in place within the corner member, the enlarged diameter portion thereof 50b extends outwardly from the bottom wall 32 of the corner member so as to prevent the metal stringers 18 and 20 from coming into direct contact with the planar surface upon which the folded table may be placed. Because of the material selected for the fabrication of the bumpers 50, once the folded table is in position on a planar surface, the bumpers will resist any undesired sliding of the table assembly relative to the planar surface.

Figure 9:
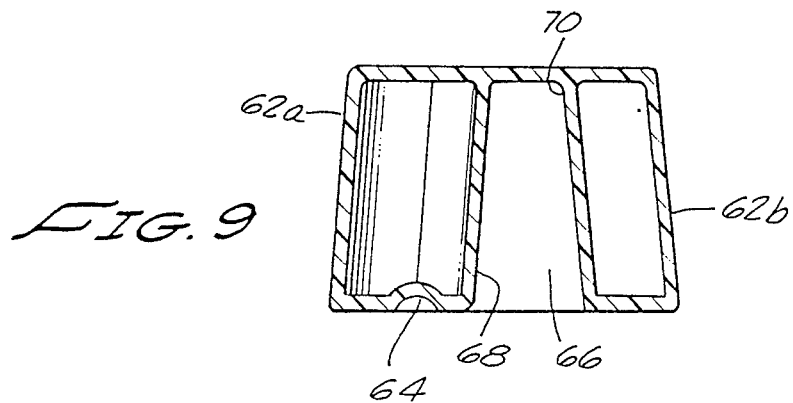
FIG. 9 is a cross-sectional view taken along lines 9—9 of FIG. 8.

Turning now to FIGS. 8 and 9, an alternate and somewhat simplified form of corner piece or molding is thereshown. These corner pieces, generally designated by the numeral 60, like molds 27, are affixed by suitable connectors to the underside of the table top 12 at spaced apart locations proximate the corners of the table top. The corner moldings 60 each have a top wall 62, a vertically spaced bottom wall and external side walls 62a and 62b which function to interconnect the top and bottom walls. As best seen in FIG. 9, the bottom wall is provided with a bumper receiving cavity 64 and the external walls converge inwardly in the manner shown in the drawing. Disposed in an internally spaced relationship with respect to external side walls 62a and 62b are reinforcing means here comprising internal walls 68. Internal walls 68 also converge inwardly and function to interconnect the top and bottom walls. A bottom open cavity or opening 66 is defined by walls 68.

Referring once again to FIG. 8, the external walls 62a and 62b of each corner member join to form an end wall 62c which is provided with a generally keyhole shaped slot 63. Slots 63 are adapted to closely receive the end portions of the stringers 18 and 20 which make up the apron assembly 14.

As indicated in FIG. 8, when the stringers are assembled with the corner mold members 60, the end portions of these stringers are inserted within apertures 63 until the extremities of the stringers move into engagement with the internal walls 68. This precise positioning of the stringers within the corner members insures that a rigid structural assembly will result, which assembly is precisely rectangular.

Turning now to FIGS. 10 through 23 of the drawings, an alternate form of table construction of the invention is thereshown. This form of the invention is similar in many respects to the form of the invention shown in FIGS. 1 through 10 and like numerals are used in FIGS. 10 through 23 to identify like components. The table of this alternate embodiment of the invention comprises a generally planar top 70, an apron assembly 72 connected to the underside of the top and two pairs of longitudinally spaced leg assemblies 16 which are hingably interconnected with apron assembly 72. In this form of the invention, the top 70 is constructed in two halves 70a and 70b and the apron assembly 72 comprises two end stringers 20 and two side stringers 74. Each of the side stringers comprise first and second parts 74a and 74b which are hingably interconnected proximate their inboard ends by hinge means, or hinge mechanisms, 76. Stringers 20 and 74 are configured similarly to the stringers described previously, each having a base portion 22 and a generally perpendicularly downwardly extending wall portion 24 connected to the base portion. The wall portions 24 of each stringer terminate in a curved lower edge portion 24a, which, as indicated in FIG. 13, is generally circular in cross-section at any point.

Forming an important part of the apron assembly of this alternate form of the invention are four one-piece, injection molded corner members, or moldings, 27 (FIG. 10). These corner moldings 27 are affixed by suitable connectors to the underside of the table top 70 at spaced apart locations proximate the corners of the table top. The corner moldings 27, which are of the same general configuration as those shown in FIG. 1 and previously described herein, function to rigidly support the end portions of stringers 20 and the outboard end portions of stringers 74a and 74b.

Because in this latter form of the invention the table top and the side stringers 74 are constructed in two halves, not only can the leg assemblies 16 be folded, but the table itself can also be folded from the operational configuration shown in the phantom lines of FIG. 11 into the folded configuration shown in the solid lines of FIG. 11. This feature substantially aids in the transport and storage of the table.

Figure 14:
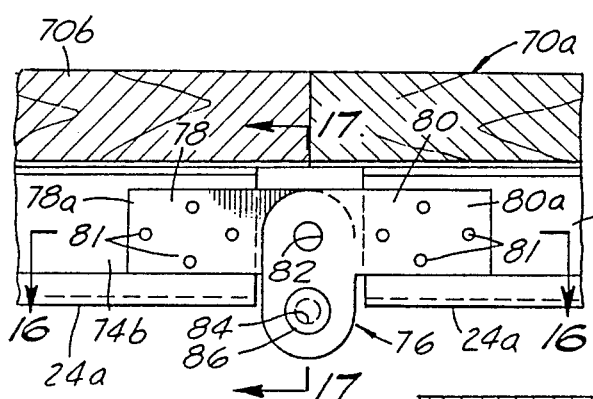
FIG. 14 is an enlarged fragmentary view taken along lines 14—14 of FIG. 10 illustrating the construction of the hinge mechanism of this embodiment of the invention.
Figure 16:
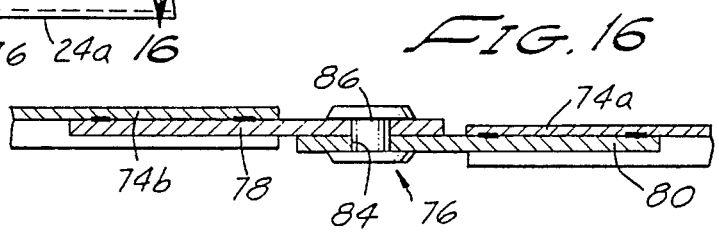
FIG. 16 is an enlarged cross-sectional view taken along lines 16—16 of FIG. 14.
Figure 15:
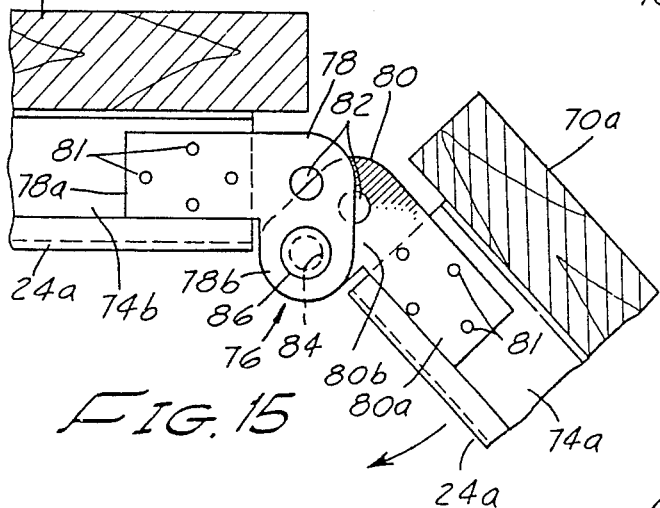
FIG. 15 is a fragmentary cross-sectional view similar to FIG. 14 but showing one portion of the table top being pivotally moved toward a closed position.
Figure 17:
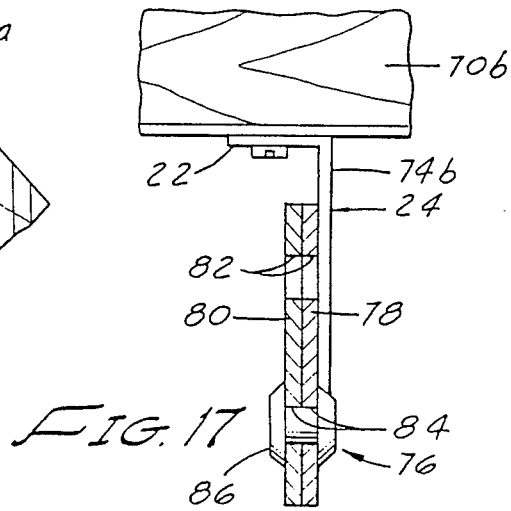
FIG. 17 is an enlarged cross-sectional view taken along lines 17—17 of FIG. 14.

Referring to FIGS. 14 through 17, the hinge mechanism 76, which hingably joins the inboard ends of stringers 74a and 74b, can be seen to comprise cooperating generally "L" shaped members 78 and 80. Legs 78a and 80a of the hinge members are connected to stringers 74b and 74a respectively by fasteners 81. Legs 78b and 80b of the hinge members are each provided with spaced apertures 82 and 84 which are aligned when the table is in an operating configuration as shown in FIG. 14. Receivable within apertures 84 of each hinge mechanism is a hinge pin 86 (FIG. 16) which defines the pivot axis about which the table top halves 70a and 70b pivot. As best seen in FIGS. 14 and 15, the hinge mechanism is constructed so that the pivot axis is disposed in a plane slightly below the plane of the lower surfaces of curved edges 24a of the stringers so that these lower surfaces move into close proximity when the table is folded into the configuration shown in the solid lines of FIG. 11. As indicated in FIG. when the table is in its closed, or folded, configuration, the lower surfaces of corner members 27 are in engagement.

Figure 18:
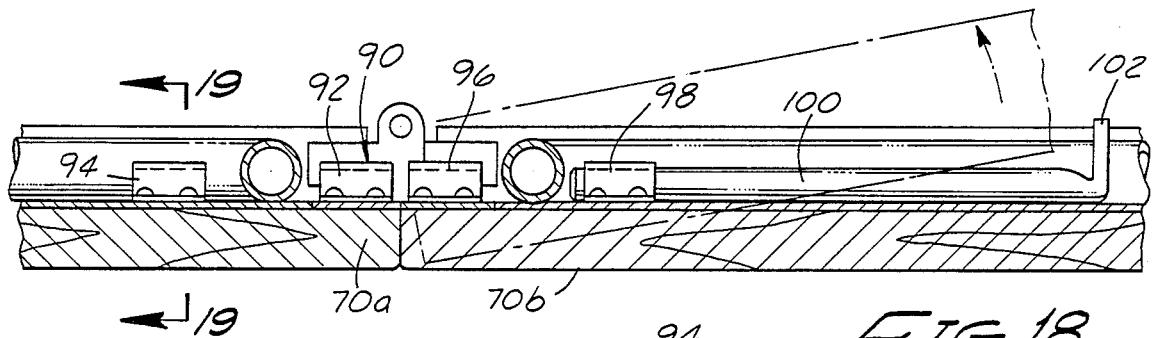
FIG. 18 is a cross-sectional view taken along lines 18—18 of FIG. 10 illustrating the construction of the center locking mechanism.
Figure 19:
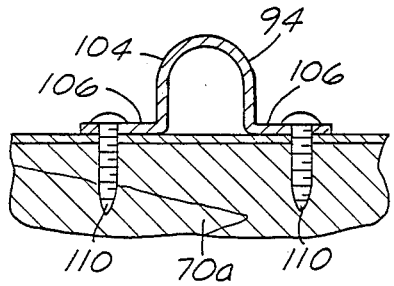
FIG. 19 is an enlarged fragmentary cross-sectional view taken along lines 19—19 of FIG. 18.
Figure 20:
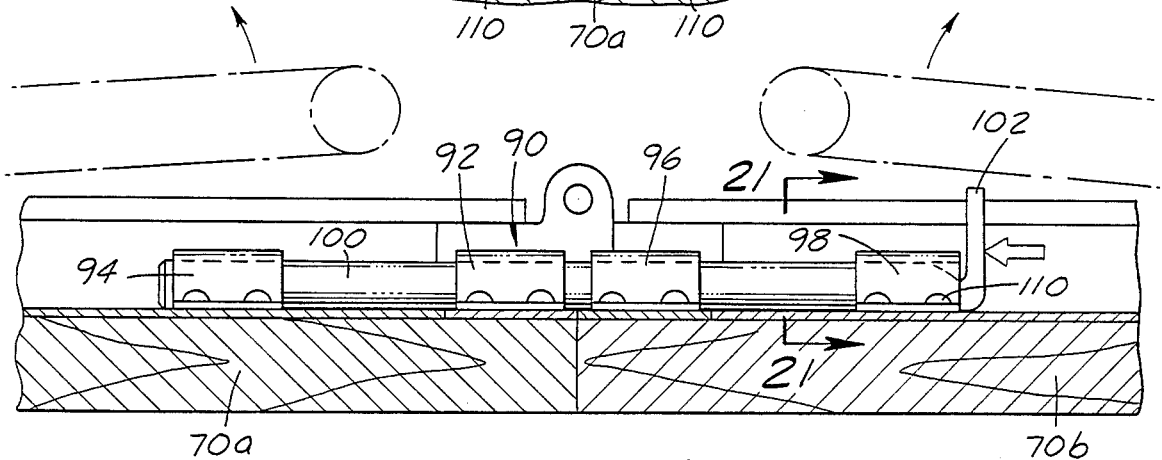
FIG. 20 is an enlarged fragmentary cross-sectional view similar to FIG. 18, but showing the locking mechanism in a locked position.
Figure 21:
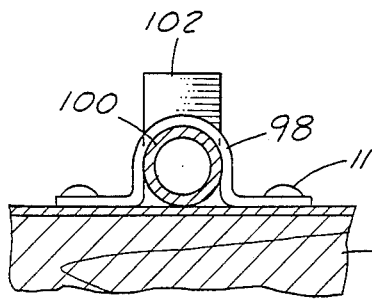
FIG. 21 is a cross-sectional view taken along lines 21—21 of FIG. 18.
Figure 22:
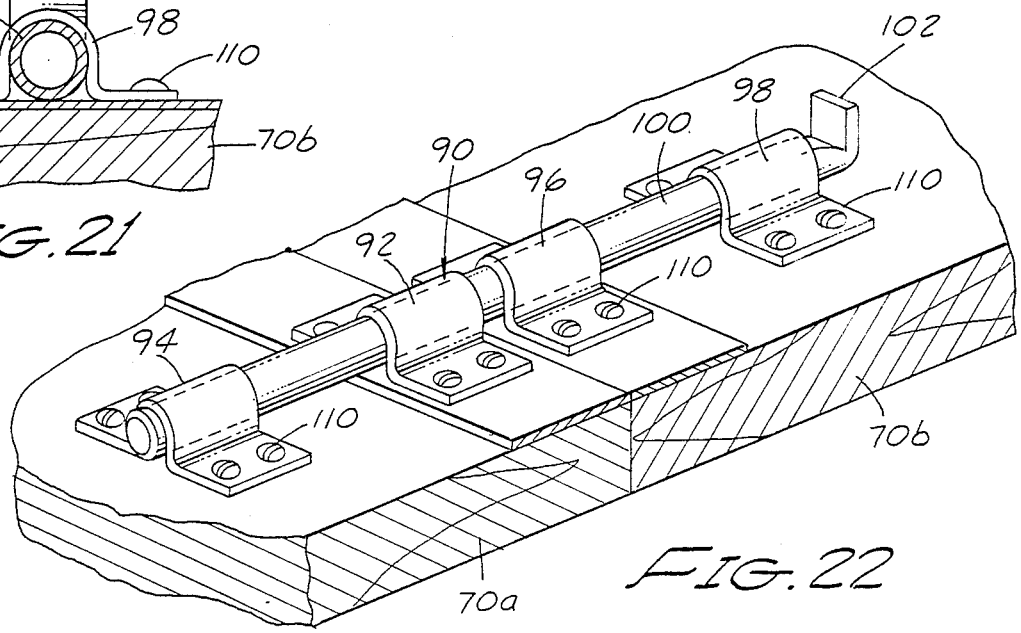
FIG. 22 is fragmentary, generally perspective view of the center locking mechanism.

Turning to FIGS. 18 and 22, a locking means, or locking mechanism, 90 is provided proximate the center of the table. Locking mechanism 90 comprises a sliding bolt arrangement which includes first inboard and outboard bolt receiving members 92 and are affixed to half 70a of the table top and a second inboard and outboard bolt receiving members 96 and 98 affixed to half 70b of the table top. The sliding bolt arrangement also includes an elongated bolt 100 which is slidably receivable within the receiving members. Bolt 100 is provided with an upstanding gripping portion 102 proximate one end and is movable in FIG. 18 to a locked position shown in FIGS. 20 and 22. As best seen in FIG. 19, each of the receiving members is generally "U" shaped, having a bolt receiving body 104 and horizontally extending, apertured flanges 106 which are connected to the table top by suitable fasteners such as screws 110.

When it is desired to fold the table, bolt 100 is moved to the first unlocked position shown in FIG. 18. In this position the bolt is free of receiving members 94 and 92 and the table can be folded in the manner shown in FIG. 15. When it is desired to lock the table in the erected planar configuration, bolt 100 is moved to the left into the position shown in FIG. 20. In this position the table is securely held in the planar position.

Figure 12:
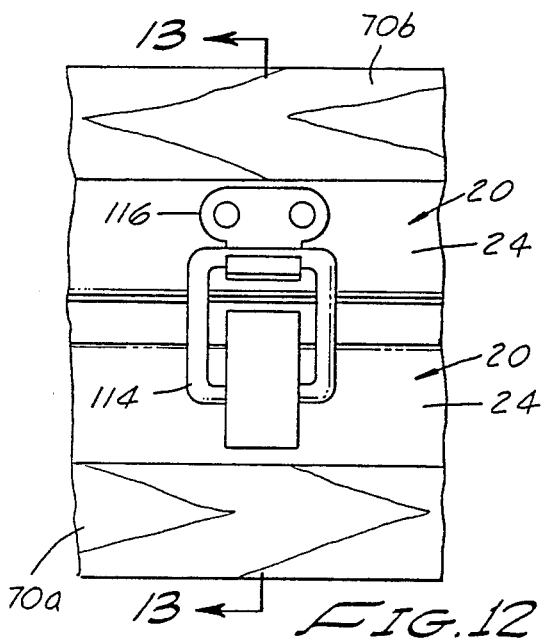
FIG. 12 is a greatly enlarged fragmentary view taken along lines 12—12 of FIG. 11 showing a locking mechanism for releasably locking the table in its folded configuration.
Figure 13:
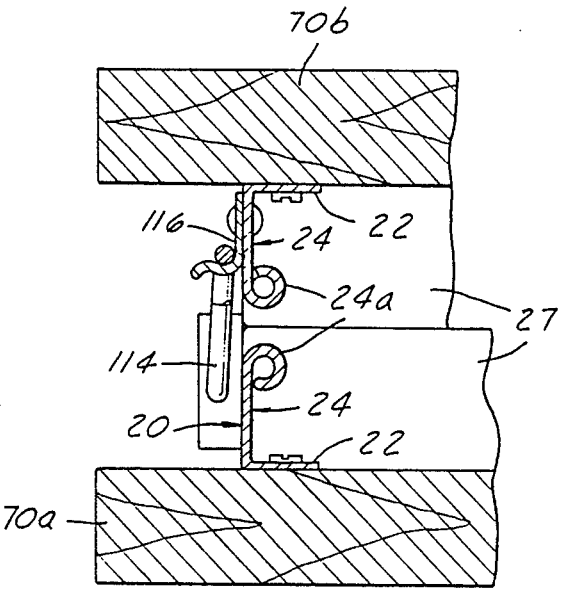
FIG. 13 is a cross-sectional view taken along lines 13—13 of FIG. 12.

Turning to FIGS. 12 and 13, latching means are there illustrated for locking the table in the folded configuration shown in these Figures. In the embodiment of the invention shown, the latching means is provided in the form of a cam-type latch having a ring shaped portion 114 carried by one of the end stringers 24 of the apron assembly and a ring receiving portion 116 carried by the adjacent end stringer 24. With the latch assembly in the latched configuration shown in FIGS. 12 and 13, the table will be locked in the folded configuration for easy transportation. By lifting up on the ring portion of the latch to disengage the ring from the ring receiving groove and by threadably retracting wing nut 112, the table can be easily erected into its operable configuration.

To assist in transporting the table in its folded configuration, carrying means, shown in FIG. 11 in the form of a handle 118, is provided. Handle 118 is pivotally mounted intermediate the ends of stringer 74a of the apron assembly 14 so that the table can be easily lifted and carried with one hand.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:
1. A table construction, comprising:
 (a) a generally planar top having first and second portions; and
 (b) an apron assembly connected to said top, comprising:
  (i) a first elongated angle end member connected to said first portion of said top, a second elongated angle end member connected to said second portion of said top each said first and second end member having a base and a generally perpendicularly extending wall connected to said base, said wall having end portions terminating in a curved lower edge portion; said edge portion being generally circular in cross-section:

(ii) two elongated angle side members each having a base and a generally perpendicularly extending wall connected to said base, said wall having end portions terminating in a curved lower edge portion; said edge portion being generally circular in cross-section, each said side members comprising first and second portions, said first portion being connected to said first portion of said top and said second portions being connected to said second portion of said top;

(iii) four one-piece, injection molded corner members attached to said planar top, each having a top wall, a spaced apart bottom wall, external side walls interconnecting said top and bottom walls, said external walls being provided with at least two vertically extending key-hole shaped slots adapted to closely receive said end portions of said walls of said elongated angle end and side members, internal side walls spaced from said external walls, and reinforcing means connected to said internal walls for structurally reinforcing said internal walls said reinforcing means comprising a plurality of wall members disposed intermediate said external side walls and said internal side walls; and (iv) first hinge means for hingably interconnecting said first and second portions of said side members whereby said first and second portions of said top can be pivoted relative to one another from a first generally planar configuration into a folded configuration.

2. A table construction as defined in claim 1 including first and second support members affixed to said first and second portions of said top proximate the center thereof and second hinge means for hingably interconnecting said first and second support members.

3. A table construction as defined in claim 1 including latching means carried by said end members for latching together said first and second parts of said top when said top is in said folded configuration.

4. A table construction as defined in claim 1 including locking means mounted on said top for locking said table in a first generally planar configuration.

5. A table construction as defined in claim 4 including carrying means mounted on one of said side members for carrying said table when said top is in a folded configuration.

* * * * *